US012472476B2

(12) United States Patent
Jung

(10) Patent No.: US 12,472,476 B2
(45) Date of Patent: Nov. 18, 2025

(54) MAGNETIC MIXING APPARATUS

(71) Applicants: MMPENG CO., LTD., Siheung-si (KR); Seung Ho Jung, Incheon (KR)

(72) Inventor: Seung Ho Jung, Incheon (KR)

(73) Assignees: MMPENG CO., LTD., Siheung-si (KR); Seung Ho Jung, Incheon (KR)

( * ) Notice: Subject to any disclaimer, the term of this patent is extended or adjusted under 35 U.S.C. 154(b) by 854 days.

(21) Appl. No.: 17/778,086

(22) PCT Filed: Sep. 28, 2020

(86) PCT No.: PCT/KR2020/013168
§ 371 (c)(1),
(2) Date: May 19, 2022

(87) PCT Pub. No.: WO2021/101060
PCT Pub. Date: May 27, 2021

(65) Prior Publication Data

US 2023/0001366 A1 Jan. 5, 2023

(30) Foreign Application Priority Data

Nov. 21, 2019 (KR) ........................ 10-2019-0150839

(51) Int. Cl.
*B01F 33/453* (2022.01)
*B01F 35/32* (2022.01)
*B01F 101/44* (2022.01)

(52) U.S. Cl.
CPC ...... *B01F 33/4532* (2022.01); *B01F 33/4535* (2022.01); *B01F 35/3204* (2022.01); *B01F 2101/44* (2022.01)

(58) Field of Classification Search
CPC ......................... B01F 33/4532; B01F 33/4535
(Continued)

(56) References Cited

U.S. PATENT DOCUMENTS 2,810,556 A * 10/1957 Zozulin .............. B01F 33/4535
310/104

FOREIGN PATENT DOCUMENTS

KR 20-2000-0012086 U 7/2000
KR 10-2008-0103045 A 11/2008
(Continued)

*Primary Examiner* — David L Sorkin
(74) *Attorney, Agent, or Firm* — Rabin & Berdo, P.C.

(57) ABSTRACT

A magnetic mixing apparatus is disclosed. A magnetic mixing apparatus according to one embodiment of the present invention comprises: a shaft which passes through a driving motor unit and which is rotatably coupled to the driving motor unit; a first housing which is coupled to one side of the driving motor unit and which is provided outside a stirring container to accommodate an upper part of the shaft; a rotary rotor which is coupled to the end of the shaft at a stirring container side during normal operation and which has a first permanent magnet; and an impeller unit which is arranged inside the stirring container and which has a second permanent magnet magnetically coupled to the first permanent magnet during normal operation, wherein the first housing includes a magnetic separation rotary rotor support part formed to protrude inward so as to support, from the downward direction, the rotary rotor, which is down-driven so as to move downward from the shaft, when there is magnetic separation by which magnetic coupling is released through magnetic deformation of the first permanent magnet and/or the second permanent magnet.

5 Claims, 5 Drawing Sheets

(58) Field of Classification Search
USPC .............................. 366/273, 274; 435/302.1
See application file for complete search history.

(56) References Cited

FOREIGN PATENT DOCUMENTS

| | | | |
|---|---|---|---|
| KR | 10-2011-0060434 | A | 6/2011 |
| KR | 20-2018-0001238 | U | 5/2018 |
| KR | 10-2018-0113270 | A | 10/2018 |
| KR | 20-0488254 | Y1 | 1/2019 |
| KR | 10-2097059 | B1 | 4/2020 |

* cited by examiner

MAGNETIC MIXING APPARATUS

TECHNICAL FIELD

The present invention relates to a magnetic mixing apparatus, and more particularly to a magnetic mixing apparatus which is provided in a reaction container to uniformly mix a liquid mixture and is configured to uniformly stir the liquid mixture in a fermentation reaction tank or a microorganism culture tank.

BACKGROUND ART

A mixer device is mounted on an upper portion of a conventional stirring container used for stirring a liquid mixture, and one example thereof is disclosed in Korean Utility Model Laid-Open Publication No. 20-2000-0012086 (May 7, 2000) entitled "Prefabricated Impeller of Stirring Device".

In other words, a mixing device employing a stirring blade such as an impeller is used to stir the liquid mixture in the stirring container including the fermentation reaction tank or the microorganism culture tank.

As described above, as disclosed in Korean Utility Model Laid-Open Publication No. 20-2000-0012086 (May 7, 2000), such a conventional mixing device includes a motor installed on an upper portion of a stirring container and a rotary shaft connected to an output shaft of the motor and having a plurality of stirring blades.

The above-mentioned conventional mixing device entails a problem in that since the sizes of the motor and the gear box depends on the capacity of the stirring container, the motor and the gear box occupy an unnecessary space at the upper portion of the stirring container, and requires a lifting device such as a crane when separating the motor and the gear box from the stirring container for repair or replacement.

Therefore, in recent years, a method of mounting the mixing device at a lower portion of the stirring container has been employed to solve the above-mentioned problem.

However, the above problem could be solved by the method of mounting the mixing device at the lower portion of the stirring container.

However, as described above, the mixing device may be mounted at the lower portion of the stirring container to solve the above-mentioned problem, but the rotary shaft having the stirring blades is bent and deformed in the process in which the output shaft of the motor is rotated, and thus the mixture stored in the stirring container may not be smoothly mixed.

In other words, a case occurs in which as the high viscosity liquid mixture stored in the stirring container adheres to the outer surface(s) of the rotational shaft or the stirring blades, it weakens the rotational force of the rotary shaft. In addition, the conventional mixing device involves a problem in that since pressure is applied to the rotary shaft by a strong rotational force thereof while the mixture is vortexed in the stirring container, the rotary shaft of the motor is deformed. In general, since the rotary shaft of the mixing device is arranged long in the stirring container along the longitudinal direction of the stirring container, it has a structure that can be easily bent and deformed.

This leads to subsequent problems in that the liquid mixture is not uniformly stirred since the rotary shaft rotates without having the same rotational center while shaken left and right due to vibration by a motor, and in that the rotary shaft is seriously separated from the mixing device.

Thus, recently, a mixing device employing a magnetic property has been widely used. In other words, a magnetic mixing apparatus used currently has a structure in which a rotor including a magnet is mounted on one end of the output shaft of the motor, and an impeller having a magnet is seatedly mounted on an upper portion of the rotor to fix and rotate the impeller by a magnetic force.

However, since the conventional magnetic mixing apparatus encounters a drawback in that it employs a magnet having a strong magnetic force to fixedly mount the impeller on the rotor, a bearing may be damaged or loosened when the magnet is separated from the impeller by a change in the magnetic force due to continuous use, and the rotation of the impeller may not be measured.

DISCLOSURE OF INVENTION

Technical Problem

Accordingly, the present invention has been made in order to solve the above-described problems occurring in the prior art, and it is an object of the present invention is to provide a magnetic mixing apparatus which prevents damage to the magnetic mixing apparatus and is easily maintained and repaired even when the magnetic force of the magnet is changed to cause the separation of the magnet.

Technical Solution

To achieve the above object, the present invention provides a magnetic mixing apparatus including: a shaft rotatably coupled to a drive motor unit in such a manner as to penetrate through the drive motor unit; a first housing provided on an outer side a stirring container in such a manner as to be coupled to one side of the drive motor unit so as to accommodate an upper portion of the shaft (110*a*); a rotary rotor coupled to a distal end of the shaft at the stirring container side during a normal operation thereof and including a first permanent magnet; and an impeller unit disposed on an inner side of the stirring container and including a second permanent magnet magnetically coupled to the first permanent magnet during a normal operation thereof. The first housing includes a magnetically separated rotary rotor support unit formed to protrude inwardly from the first housing so as to support, from the downward direction, the rotary rotor, which is downward driven to move downward from the shaft, when there occurs magnetic separation in which a magnetic coupling between the first permanent magnet and the second permanent magnet is released by magnetic deformation of at least one of the first permanent magnet and the second permanent magnet.

In the magnetic mixing apparatus, the rotary rotor may include a retaining support unit configured to be retainingly coupled at one side thereof to the magnetically separated rotary rotor support unit and to support the first permanent magnet at the other side thereof when there occurs the magnetic separation in which the magnetic coupling between the first permanent magnet and the second permanent magnet is released by magnetic deformation of the first permanent magnet and the second permanent magnet.

The magnetic mixing apparatus may further include a second housing disposed opposite to one side of the drive motor unit, to which the first housing is coupled with the drive motor unit interposed therebetween so as to accommodate a lower portion of the shaft.

The magnetic mixing apparatus may further include a handle unit connected to the shaft in such a manner as to penetrate through the second housing so that the handle unit can be rotated manually.

The magnetic mixing apparatus may further include a welding unit coupled to the stirring container in a state of having accommodated the rotary rotor rotatably during the magnetic coupling between the first permanent magnet and the second permanent magnet.

The magnetic mixing apparatus may further include a bearing unit disposed between the impeller unit and the welding unit and configured to guide the rotation of the impeller unit.

Advantageous Effects

The magnetic mixing apparatus according to the present invention has effects in that it is prevented from being damaged and is easily maintained and repaired even when the magnetic force of the magnet is changed to cause the separation of the magnet, and stability is improved during the stirring process.

BEST MODE FOR CARRYING OUT THE INVENTION

Figure 1:
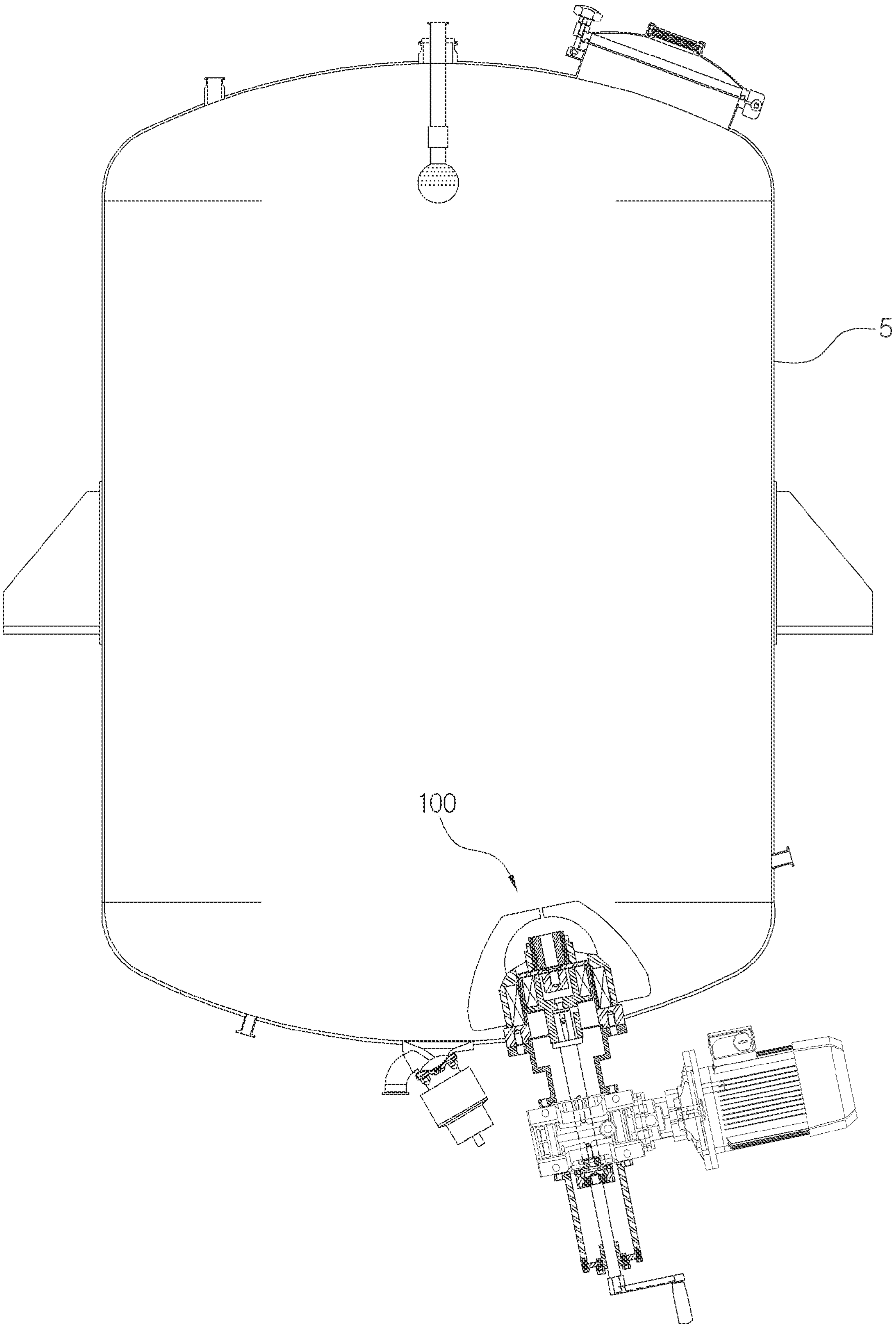
FIG. 1 is a perspective view showing a normal operation state of a magnetic mixing apparatus according to an embodiment of the present invention which is coupled to a stirring container.

To fully understand the present invention, the operational advantages of the present invention, and objects achieved by the embodiment of the present invention, reference should be made to the accompanying drawings illustrating preferred embodiments of the present invention and descriptions on the drawings.

Particular structural or functional descriptions of embodiments according to the concept of the present invention disclosed herein are merely intended for the purpose of describing embodiments according to the concept of the present invention, and the embodiments according to the concept of the present invention may be implemented in various forms and should not be construed as being limited to those described in this specification.

Various alterations and modifications may be made to the embodiments according to the concept of the present invention, some of which will be illustrated in detail in the drawings and will be described in detail herein. However, it should be understood that these embodiments are not construed as limited to the illustrated specific forms and include all changes, equivalents or alternatives within the spirit and the technical scope of this disclosure.

Although the terms "first," "second," etc. may be used to explain various elements, the elements should not be limited by such terms. These terms are used only to distinguish one element from another element. For example, a first element may be referred to as a second element, or similarly, the second component may be referred to as the first component without departing from the spirit or scope of the present invention.

When it is mentioned that one element is "connected" or "accessed" to another element, it may be understood that the one element is directly connected or accessed to another element or that still other element is interposed between the two elements. On the contrary, when it is mentioned that one element is "directly connected" or "directly accessed" to another element, it may be understood that no element is interposed therebetween. Other expressions used to describe the relationship between elements should be interpreted in a like fashion (e.g., "between" versus "directly between," or "adjacent" versus "directly adjacent").

Terms used herein are to merely explain certain embodiments, not meant to limit the scope of the present invention. A singular expression includes a plural concept unless there is a contextually distinctive difference therebetween. As used herein, the term "include" or "have" is intended to specify that characteristics, numbers, steps, operations, elements, components, etc., disclosed in the specification or combinations thereof exist. As such, it should be understood that the term "include" or "have" as used herein does not exclude the existence or additional possibilities of one or more other characteristics, numbers, steps, operations, elements, components, or combinations thereof.

Unless otherwise defined herein, all terms used herein including technical or scientific terms have the same meanings as those commonly understood by a person of ordinary skill in the art to which the present invention pertains. The commonly used terms such as those defined in dictionaries should be interpreted as being consistent with the meaning in the context of the relevant art, and unless explicitly defined herein, they are not interpreted in ideal or excessively formal sense.

Hereinafter, the present invention will be described in detail by describing a preferred embodiment of the present invention with reference to the accompanying drawings. Like reference numerals refer to like elements throughout the drawings.

Figure 2:
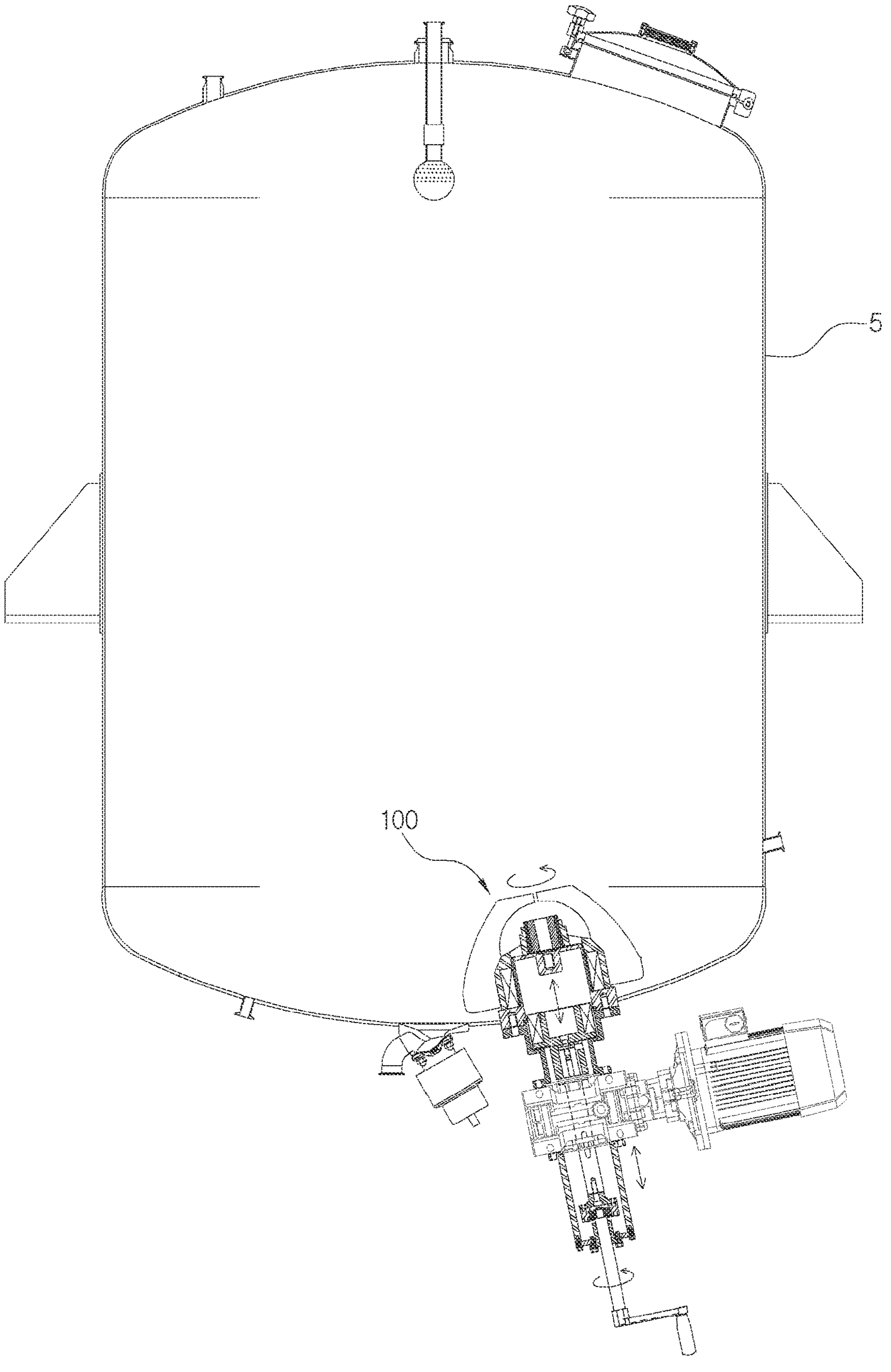
FIG. 2 is a perspective view showing a magnetic separation state of a magnetic mixing apparatus according to an embodiment of the present invention which is coupled to a stirring container.
Figure 3:
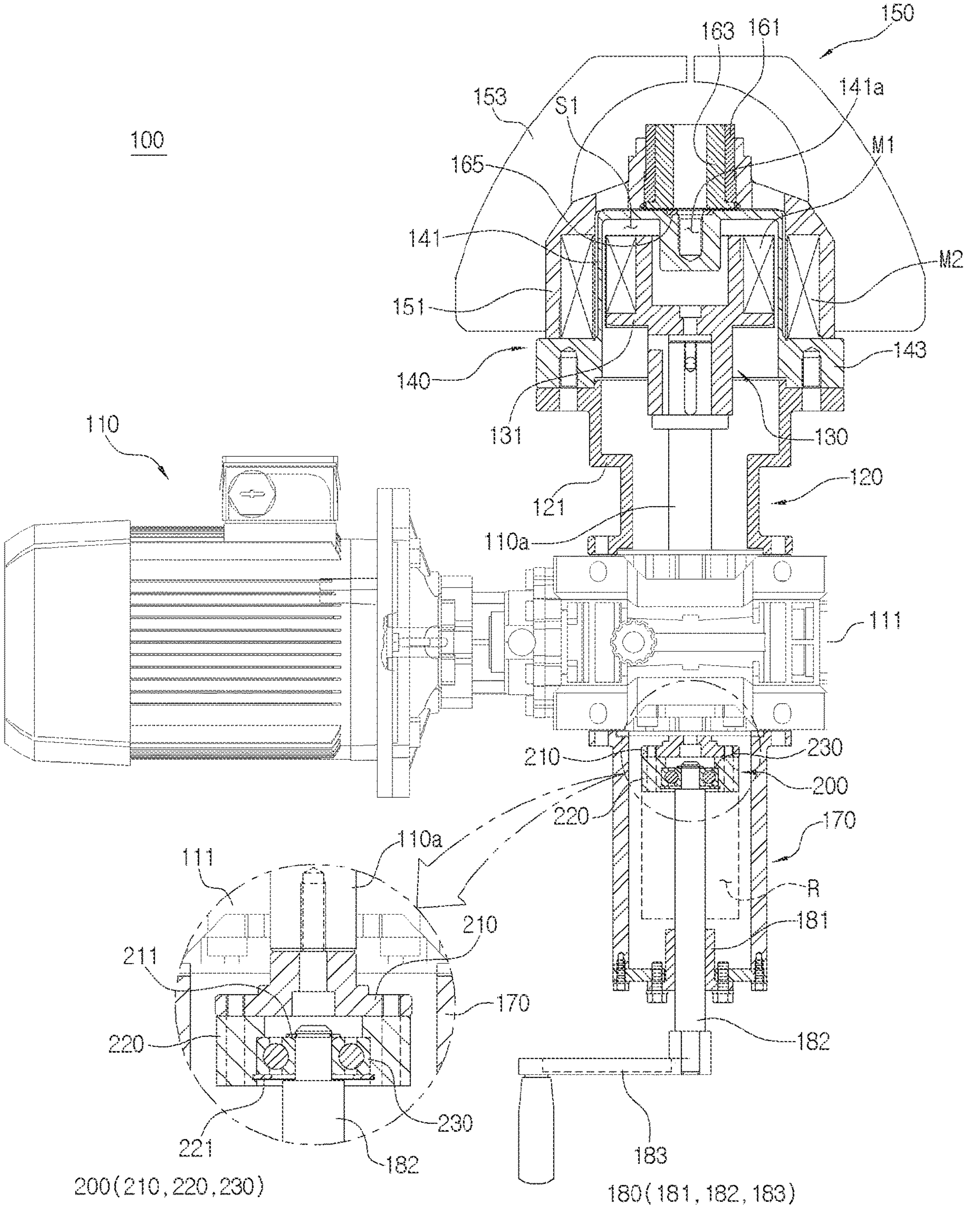
FIG. 3 is a cross-sectional view showing the magnetic mixing apparatus of FIG. 1 in an operation state.
Figure 4:
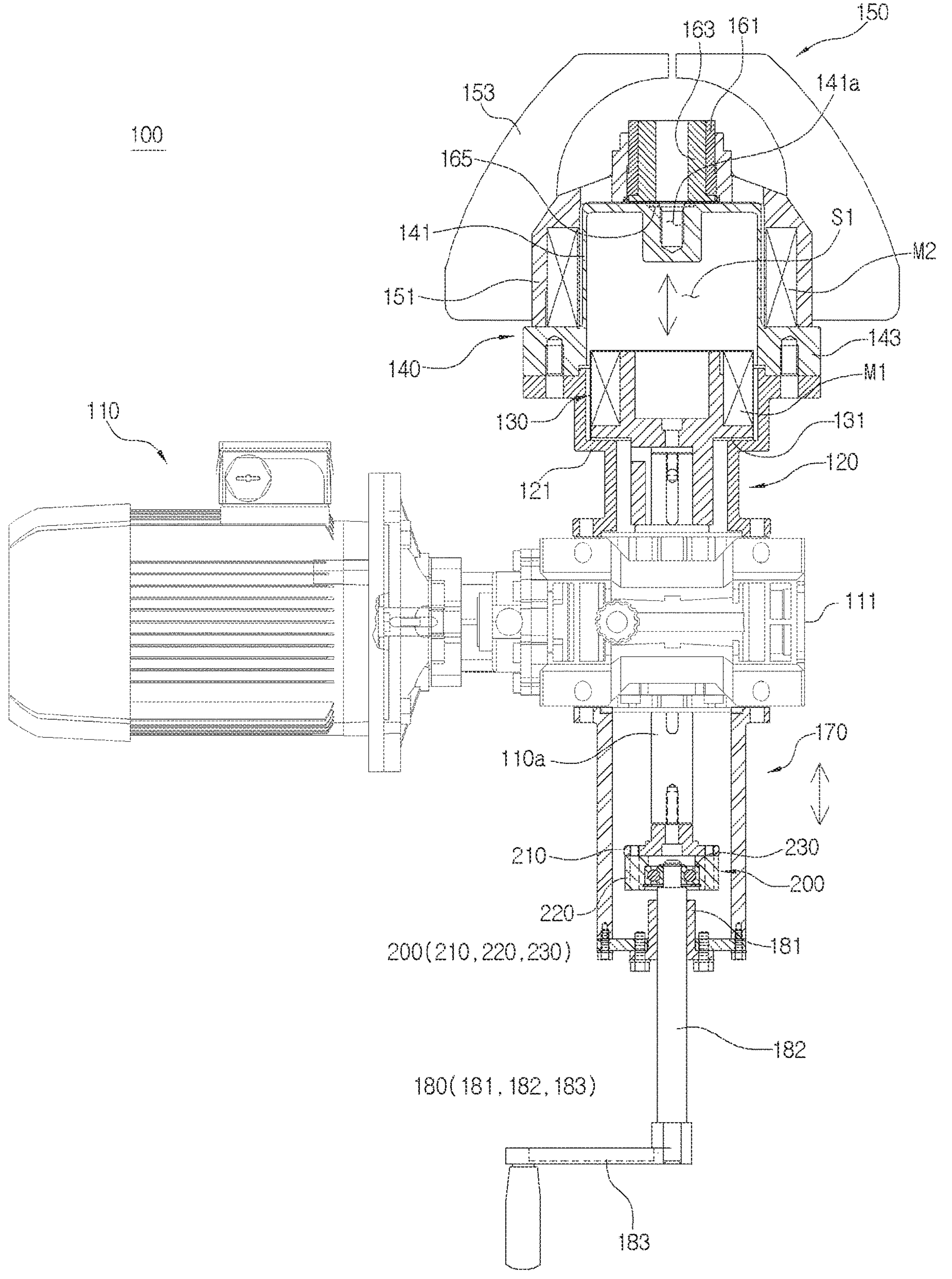
FIG. 4 is a cross-sectional view showing the magnetic mixing apparatus of FIG. 1 in a magnetic separation state.
Figure 5:
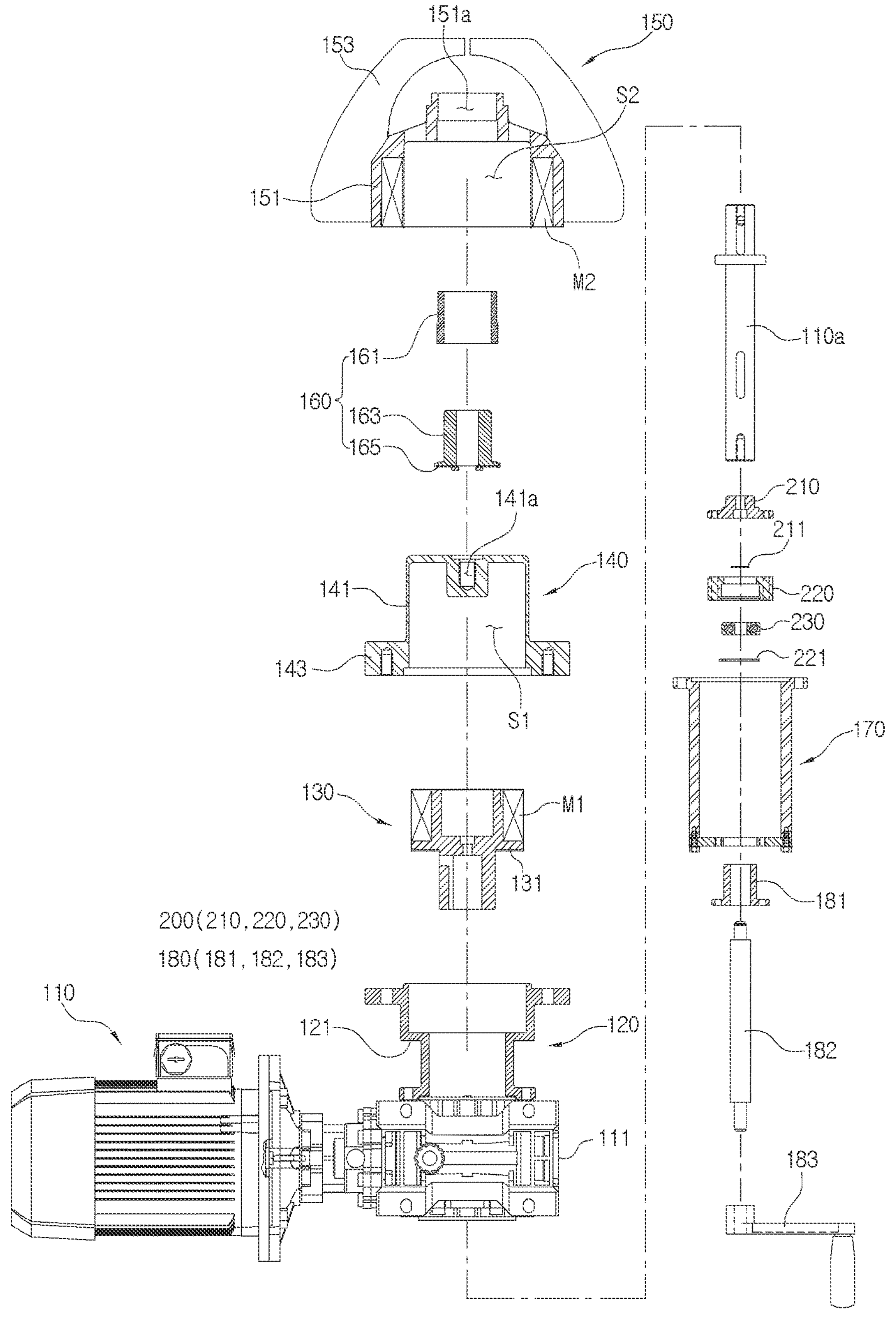
FIG. 5 is an exploded cross-sectional view showing the magnetic mixing apparatus of FIG. 1.

FIG. 1 is a perspective view showing a normal operation state of a magnetic mixing apparatus according to an embodiment of the present invention which is coupled to a stirring container, FIG. 2 is a perspective view showing a magnetic separation state of a magnetic mixing apparatus according to an embodiment of the present invention which is coupled to a stirring container, FIG. 3 is a cross-sectional view showing the magnetic mixing apparatus of FIG. 1 in an operation state, FIG. 4 is a cross-sectional view showing the magnetic mixing apparatus of FIG. 1 in a magnetic separation state, and FIG. 5 is an exploded cross-sectional view showing the magnetic mixing apparatus of FIG. 1.

As shown in FIGS. 1 to 5, a magnetic mixing apparatus 100 according to an embodiment of the present invention includes: a drive motor unit 110; a first housing 120 provided on an outer side a stirring container 5 in such a manner as to be coupled to one side of the drive motor unit 110; a rotary rotor 130 configured to be upward/downward driven and including a first permanent magnet M1; a welding unit 140; an impeller unit 150 disposed on an inner side of the stirring container 5 and including a second permanent magnet M2 magnetically coupled to the first permanent magnet M1 during a normal operation thereof; a bearing unit 160 disposed between the impeller unit 150 and the welding unit 140 and configured to guide the rotation of the impeller unit 150; a second housing 170 disposed opposite to one side of the drive motor unit 110, to which the first housing 120 is coupled with the drive motor unit 110 interposed therebetween; and a handle unit 180 connected to a shaft 110*a* in such a manner as to penetrate through the second housing 170 so that the handle unit can be rotated manually.

In this embodiment, the drive motor unit 110 is a power source that transmits a rotational power to the impeller unit 150 and is provided at an outer lower portion of the stirring container 5. However, the scope of the present invention is not limited thereto, and but may be provided at a necessary position of the outer side the stirring container 5 as necessary.

In addition, the shaft 110*a* is rotatably coupled to a drive motor unit 110 in such a manner as to penetrate through the drive motor unit 110.

A speed reducer 111 for reducing the rotational speed of the shaft 110*a* or changing the rotational direction of the shaft 110*a* may be mounted on the drive motor unit 110, and the configuration of the speed reducer 111 may be easily carried out by a person of ordinary skill in the art, and thus a detailed description thereof will be omitted in this embodiment.

The first housing 120 serves to accommodate the upper portion of the shaft 110*a* to protect the shaft 110*a* from the outside environment. The first housing 120 may be connected at one end thereof to the speed reducer 111 mounted on the drive motor unit 110 and connected at the other end thereof to a bottom of the welding unit 140. In addition, the first housing 120 according to this embodiment is formed to protrude inwardly therefrom so that when there occurs magnetic separation in which magnetic coupling is released by magnetic deformation of at least one of the first permanent magnet M1 and the second permanent magnet M2 due to continuous use of the magnetic mixing apparatus 100, which causes a magnetic change, the rotary rotor 130 is automatically driven downward by gravity.

In other words, magnetic deformation causing a magnetic change due to continuous use of the magnetic mixing apparatus 100 may occur in the first permanent magnet M1 and the second permanent magnet M2. As such, when the magnetic deformation occurs in at least one of the first permanent magnet M1 and the second permanent magnet M2, the magnetic separation may occur in which a magnetic coupling between the first permanent magnet M1 and the second permanent magnet M2 is released. In the related art, even when such magnetic separation occurs, the bearing and the impeller are continuously rotated in an incomplete coupling state therebetween or a released state of the magnetic coupling therebetween, leading to damage to the bearing and the impeller, and thus the rotation of the impeller is not measured, and the bearing may be released or a fastening bolt may be damaged.

However, in the magnetic mixing apparatus 100 according to this embodiment, when the magnetic deformation occurs in at least one of the first permanent magnet M1 and the second permanent magnet M2, the magnetic separation is induced to cause the rotary rotor 130 to be automatically driven downward by gravity. A rotary rotor 130*b* downward driven by gravity due to occurrence of the magnetic separation in a rotary rotor 130*a* of a normal state is supported from the downward direction by a magnetically separated rotary rotor support unit 121 of the first housing 120 so that the rotary rotor 130*b* is protected stably. Thus, there is an advantage in that the impeller unit 150 and the bearing unit 160 are not damaged, and the bearing unit 160 is not loosened or the fastener is not damaged even during the magnetic separation.

The rotary rotor 130 is coupled to the distal end of the shaft 110*a* at the stirring container 5 side during a normal operation thereof and is automatically driven downward by gravity when occurs the magnetic separation so that the impeller unit 150 continues to be rotated in a state in which magnetic deformation has occurred, thereby preventing damage due to abnormal rotation such as twisting.

That is, according to this embodiment, the rotary rotor 130 includes a retaining support unit 131 that is retainingly coupled to the magnetically separated rotary rotor support unit 121 when there occurs magnetic separation in which a magnetic coupling between the first permanent magnet M1 and the second permanent magnet M2 is released by magnetic deformation of the first permanent magnet M1 and the second permanent magnet M2. Thus, even if the rotary rotor 130 is automatically driven downward by gravity, it is not excessively separated to secure stability.

In addition, according to this embodiment, the retaining support unit 131 has a structure in which it is retainingly coupled at one side thereof to the magnetically separated rotary rotor support unit 121 and to support the first permanent magnet M1 at the other side thereof, Thus, since the distance between the first permanent magnet M1 and the second permanent magnet M2 is close during the normal operation of the rotary rotor 130, sensitivity of the magnetic separation occurring between the first permanent magnet M1 and the second permanent magnet M2 is improved. As such, the improvement of the sensitivity of the magnetic separation can efficiently cope with the occurrence of the magnetic separation, thereby preventing damage to each element.

Meanwhile, the rotary rotor 130 may include the first permanent magnet M1 as described above. A plurality of first permanent magnets M1 may be embedded in the rotary rotor 130 at predetermined intervals, and may be arranged along the upper circumferential direction of the rotary rotor 130 so as to be rotated together with the rotary rotor 130 by driving the driving motor unit 110 during the normal operation of the rotary rotor 130.

The welding unit 140 is coupled to the stirring container 5 in a state of having accommodated the rotary rotor 130 rotatably when the rotary rotor 130 is operated normally through the magnetic coupling between the first permanent magnet M1 and the second permanent magnet M2.

In other words, the welding unit 140 may be coupled to the stirring container 5 in a state of having been inserted into an insertion hole formed at the bottom of the stirring container 5. The welding unit 140 may include a protruding cap 141 inserted into the insertion hole formed at the bottom of the stirring container 5 in such a manner as to protrude into the stirring container 5 and having a first accommodation space S1 formed therein to allow the rotating rotor 130 to be inserted thereinto, and a first flange 143 provided at a lower portion of the protruding cap 141 in such a manner as to come into close contact with the stirring container 5.

The protruding cap 141 is a part disposed inside the stirring container 5, and as described above, the first accommodation space S1 is formed in the protruding cap 141 so that the rotating rotor 130 can be inserted thereinto and rotated.

The first flange 143 may be bonded to the inner surface of the stirring container 5, which dividedly forms the insertion hole of the stirring container 5 in a state of having been inserted into the insertion hole, or to the bottom surface or the underside of the stirring container 5.

The first flange 143 may be bonded to the stirring container 5 by various known bonding methods, but the outer circumferential surface of the first flange 143 and the inner surface 5*a* of the stirring container 5 is preferably bonded to each other by a welding method in terms of maintaining airtightness of the stirring container 5, or the first flange 143 and the stirring container 5 is preferably fastened to each other by a known fastening means such as a bolt or a nut and a bolt to maintain the airtightness of the stirring container 5 using a sealing member.

The impeller unit 150 includes a main body 151 for allowing the second permanent magnet M2 to be embedded therein and having a second accommodation space S2 formed therein to allow the protruding cap 141 of the welding part 140 to be inserted thereinto, and a plurality of stirring blades 153 arranged on the outer surface of the main body 151 so as to be spaced apart from each other at predetermined intervals.

Since the main body 151 is rotated in a state of having accommodated the protruding cap 141 protruded into the stirring container 5, it may be rotated inside the stirring container 5 in cooperation with the rotation of the rotary rotor 130 inserted into the first accommodation space S1.

That is, when the rotary rotor 130 is rotated along with the magnetic coupling between the first permanent magnet M1 embedded in the rotary rotor 130 and the second permanent magnet M2 embedded in the main body 151, the main body 151 of the impeller unit 150 may also be rotated.

In other words, since the second permanent magnet M2 embedded in the main body 151 may be magnetically coupled to the first permanent magnet M1 of the rotary rotor 130 inserted into the first accommodation space S1 of the protruding cap 141, the main body 151 may be rotated in cooperation with the drive motor unit 110.

As shown in FIG. 4, the bearing unit 160 may include a female bearing 161 rotatably inserted into a through-hole 151*a* (see FIG. 5) formed in the upper part of the main body 151, a male bearing 163 rotatably inserted into the female bearing 161, and a washer 165 provided at the lower end of the male bearing 163.

The female bearing 161 and the male bearing 163 may have a tubular shape.

That is, the female bearing 161 has a hole sized to allow the male bearing 163 to pass therethrough and not to allow the washer to pass therethrough.

For reference, the female bearing 161 and the male bearing 163 may be made of a material having an excellent strength and a strong corrosion resistance to acid and alkali such as tungsten carbide, and the washer 165 may be made of a stainless steel (SUS) material having a strong corrosion resistance.

In the meantime, the magnetic mixing apparatus according to an embodiment of the present invention may further include a height adjustment member 200.

The height adjustment member 200 is connected to an elevating rod R connected to a lower end of the shaft 110*a* in a screw-coupling manner, and may adjust the height of the rotation rotor 130 inserted into the first accommodation space S1 of the welding unit 140 by turning in one direction or the other direction. The height adjustment member 200 includes a height adjustment shaft connector 210 coupled to the shaft 110*a* and including a shaft connecting washer 211, a height adjustment connector 220 adjacently coupled to the height adjustment shaft connector 210 and including a connector washer 221, and a height adjustment handle connector 230 insertedly coupled to the inside of the height adjustment connector 220.

The height adjustment member 200 may adjust the height of the rotary rotor 130 accommodated in the welding unit 140 to adjust the strength of the attraction between the first permanent magnet M1 and the second permanent magnet M2 when the impeller unit 150 is mounted on the welding unit 140 or the impeller unit 150 mounted on the welding unit 140 is manually separated from the welding unit 140.

More specifically, when the height adjustment member 200 is rotated in a screw releasing direction, the elevating rod R and the output shaft 110*a* may be lowered, and thus the rotary rotor 130 may also be lowered in the first accommodation space S1 of the welding unit 140.

Then, as the first permanent magnet M1 embedded in the rotary rotor 130 is exposed to the outside from the first accommodation space S1, the attraction between the first permanent magnet M1 and the second permanent magnet M2 of the impeller unit 150 is reduced. Accordingly, an operator may perform replacement or maintenance of the apparatus after easily removing the impeller unit 150 seated on the upper port of the welding unit 140 from the welding unit 140.

In addition, preferably, after the rotary rotor 130 has been lowered in the first accommodation space S1 of the welding unit 140, the impeller unit 150 is mounted on the welding unit 140. That is, when the protruding cap 141 of the welding unit 140 is inserted into the second accommodation space S2 of the impeller unit 150, the impeller unit 150 is preferably seatedly mounted on the welding unit 140 in a state of not interfering with the attraction between the first permanent magnet M1 and the second permanent magnet M2 in terms of determining the exact mounting position.

When the protruding cap 141 of the welding unit 140 is inserted into the second accommodation space S2 of the impeller unit 150, the operator may rotate the height adjustment member 200 in the screw coupling direction. Then, the rotary rotor 130 lowered in the first accommodation space S1 of the welding unit 140 is completely inserted into the first accommodation space S1 while being lifted in the first accommodation space S1, and thus an attraction occurs between the first permanent magnet M1 and the second permanent magnet M2 so that the impeller unit 150 may be securely mounted on the welding unit 140.

Meanwhile, the handle unit 180 penetrates through the second housing 170 and is connected to the shaft 110*a* through the height adjustment member 200. That is, the handle unit 180 is coupled to the height adjustment member 200 so as to be connected to the shaft 110*a*. The height adjustment member 200 may be adjusted by manually rotating the handle unit 180 and the handle unit 180 includes a bearing 181, a rotary shaft 182, and a handle grip 183.

Further, the second housing 170 may accommodate and protect the lower part of the shaft 110*a* and the height adjustment member 200, and may prevent the height adjustment member 200 from being excessively separated.

According to this embodiment, as described above, when magnetic separation occurs, the rotary rotor 130 is automatically driven downward to prevent damage to the impeller unit 150 and the bearing unit 160. In addition, even if the rotary rotor 130 is automatically driven downward due to magnetic separation, the magnetically separated rotary rotor support unit 121 supports the rotary rotor 130 driven downward due to magnetic separation so that the rotary rotor 130 can be prevented from being excessively exposed downward from the first accommodation space S1.

In addition, even when the magnetic separation does not occur, the coupling between the first permanent magnet M1 and the second permanent magnet M2 may be manually released through the height adjustment member 200, and in this case, the respective elements may be easily separated, thereby increasing maintenance efficiency.

The magnetic mixing apparatus according to the embodiment of the present invention having the structure and action as described above has effects in that it is prevented from being damaged and is easily maintained and repaired even when the magnetic force of the magnet is changed to cause the separation of the magnets, and stability is improved during the stirring process.

While the present invention has been described in connection with the exemplary embodiments illustrated in the drawings, they are merely illustrative and the invention is not limited to these embodiments. It will be appreciated by a person of ordinary skill in the art that various equivalent modifications and variations of the embodiments can be made without departing from the spirit and scope of the present invention. It is obvious that such modifications and variations fall within the spirit and scope of the appended claims.

The invention claimed is:

1. A magnetic mixing apparatus comprising:

a shaft rotatably coupled to a drive motor unit in such a manner as to penetrate through the drive motor unit;

a first housing provided on an outer side a stirring container in such a manner as to be coupled to one side of the drive motor unit so as to accommodate an upper portion of the shaft;

a second housing provided on another side of the drive motor unit that is opposite to said one side of the drive motor unit such that the drive motor unit is interposed between the first housing and the second housing, the second housing accommodating a lower portion of the shaft;

a rotary rotor coupled to a distal end of the shaft at the stirring container side during a normal operation thereof and including a first permanent magnet;

an impeller unit disposed on an inner side of the stirring container and including a second permanent magnet magnetically coupled to the first permanent magnet during a normal operation thereof;

a height adjustment member connected to the shaft and configured to adjust height of the rotary rotor; and a handle unit penetrating through the second housing and coupled to the height adjustment member, wherein the second housing accommodates the height adjustment member, and wherein the first housing comprises a magnetically separated rotary rotor support unit formed to protrude inwardly from the first housing so as to support, from the downward direction, the rotary rotor, which is downward driven to move downward from the shaft, when there occurs magnetic separation in which a magnetic coupling between the first permanent magnet and the second permanent magnet is released by magnetic deformation of at least one of the first permanent magnet and the second permanent magnet.

2. The magnetic mixing apparatus according to claim 1, wherein the rotary rotor comprises a retaining support unit configured to be retainingly coupled at one side thereof to the magnetically separated rotary rotor support unit and to support the first permanent magnet at the other side thereof when there occurs the magnetic separation in which the magnetic coupling between the first permanent magnet and the second permanent magnet is released by magnetic deformation of the first permanent magnet and the second permanent magnet.

3. The magnetic mixing apparatus according to claim 1, further comprising a welding unit coupled to the stirring container in a state of having accommodated the rotary rotor rotatably during the magnetic coupling between the first permanent magnet and the second permanent magnet.

4. The magnetic mixing apparatus according to claim 3, further comprising a bearing unit disposed between the impeller unit and the welding unit and configured to guide the rotation of the impeller unit.

5. The magnetic mixing apparatus according to claim 1, wherein the handle unit includes a bearing, a rotary shaft and a handle grip.

* * * * *